US011709357B2

(12) United States Patent
Qin et al.

(10) Patent No.: US 11,709,357 B2
(45) Date of Patent: Jul. 25, 2023

(54) DEVICES AND METHODS FOR DETECTING AND REMOVING VAPOR

(71) Applicant: ZHEJIANG DAHUA TECHNOLOGY CO., LTD., Zhejiang (CN)

(72) Inventors: Fei Qin, Hangzhou (CN); Zhiqiang Yang, Hangzhou (CN); Lihe Jin, Hangzhou (CN); Yanpeng Wang, Hangzhou (CN); Yiwei Li, Hangzhou (CN); Xuanxuan Zhu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 181 days.

(21) Appl. No.: 17/169,486

(22) Filed: Feb. 7, 2021

(65) Prior Publication Data

US 2021/0157131 A1 May 27, 2021

Related U.S. Application Data

(63) Continuation of application No. 16/285,155, filed on Feb. 25, 2019, now Pat. No. 10,928,630, which is a
(Continued)

(30) Foreign Application Priority Data

Aug. 31, 2016 (CN) .......................... 201610800005.1
Jan. 23, 2017 (CN) .......................... 201710058610.0

(51) Int. Cl.
*G02B 27/00* (2006.01)
*G01N 21/552* (2014.01)
(Continued)

(52) U.S. Cl.
CPC ....... *G02B 27/0006* (2013.01); *G01N 21/552* (2013.01); *G01N 21/59* (2013.01);
(Continued)

(58) Field of Classification Search
CPC .. G01N 21/59; G01N 21/552; G02B 27/0006; G03B 17/02; G03B 43/00;
(Continued)

(56) References Cited

U.S. PATENT DOCUMENTS 4,500,412 A * 2/1985 Takahashi .............. G01N 27/12
204/429
6,307,198 B1 10/2001 Asakura et al.
(Continued)

FOREIGN PATENT DOCUMENTS

CN 2877171 Y 3/2007
CN 201392312 Y 1/2010
(Continued)

OTHER PUBLICATIONS

International Search Report in PCT/CN2017/099534 dated Nov. 20, 2017, 6 pages.
(Continued)

*Primary Examiner* — Tri T Ton
(74) *Attorney, Agent, or Firm* — Metis IP LLC

(57) ABSTRACT

The present disclosure relates to devices and methods for detecting and removing vapor for an imaging acquisition device. A device for detecting and removing vapor may include a first light guide. The first light guide may include a first end to receive a light beam, and a second end to output the light beam at a predetermined angle with respect to a reference plane, so that when the light beam enters a target light transmission media from the first light guide, the light beam substantially perfectly reflects between a first surface and a second surface of the target light transmission media.
(Continued)

The first surface and second surface may substantially parallel to the reference plane.

19 Claims, 9 Drawing Sheets

Related U.S. Application Data continuation of application No. PCT/CN2017/099534, filed on Aug. 29, 2017.

(51) Int. Cl.
| | | |
|---|---|---|
| *H04N 23/51* | (2023.01) | |
| *H04N 23/52* | (2023.01) | |
| *H04N 23/56* | (2023.01) | |
| *H04N 23/81* | (2023.01) | |
| *G01N 21/59* | (2006.01) | |
| *G03B 17/02* | (2021.01) | |
| *G03B 43/00* | (2021.01) | |

(52) U.S. Cl.
CPC ............ *H04N 23/51* (2023.01); *H04N 23/52* (2023.01); *H04N 23/56* (2023.01); *H04N 23/811* (2023.01); *G03B 17/02* (2013.01); *G03B 43/00* (2013.01)

(58) Field of Classification Search
CPC ............... H04N 5/2171; H04N 5/2252; H04N 5/22521; H04N 5/2256; H04N 5/2254; H04L 65/1069; H04L 65/60; H04L 65/612; H04R 1/1016; H04R 1/1091; H04R 2420/07; H04R 2499/11; H04R 3/12; H04R 5/033; H04S 1/007; H04W 4/80; H04W 56/001; H04W 76/14; H04W 8/04; G01R 27/2605; H01L 21/28008; H01L 22/14
USPC ....................................... 356/432–448, 237.1
See application file for complete search history.

(56) References Cited

U.S. PATENT DOCUMENTS

| | | | |
|---|---|---|---|
| 7,348,586 | B2 | 3/2008 | Ishikawa et al. |
| 7,612,799 | B1 | 11/2009 | Frank et al. |
| 2008/0100933 | A1 | 5/2008 | Yuan |
| 2011/0031921 | A1 | 2/2011 | Han |
| 2011/0253917 | A1 | 10/2011 | Rothenhaeusler |
| 2012/0177357 | A1 | 7/2012 | Lee |
| 2014/0321709 | A1 | 10/2014 | Kasahara et al. |
| 2015/0219364 | A1* | 8/2015 | Johnson ............... F24S 10/50 126/714 |
| 2016/0241059 | A1 | 8/2016 | Li |
| 2017/0002307 | A1* | 1/2017 | Ikefuji ................. C12M 41/34 |
| 2017/0343502 | A1* | 11/2017 | Ali ...................... G01N 27/123 |
| 2018/0007771 | A1 | 1/2018 | Satou et al. |

FOREIGN PATENT DOCUMENTS

| | | |
|---|---|---|
| CN | 203149259 U | 8/2013 |
| CN | 104238241 A | 12/2014 |
| CN | 204046700 U | 12/2014 |
| CN | 104378537 A | 2/2015 |
| CN | 204156981 U | 2/2015 |
| CN | 104391419 A | 3/2015 |
| CN | 204928977 U | 12/2015 |
| CN | 204929000 U | 12/2015 |
| CN | 205386130 U | 7/2016 |
| CN | 106851061 A | 6/2017 |
| EP | 2846152 A1 | 3/2015 |
| JP | 2014163585 A | 9/2014 |
| JP | 2016153774 A | 8/2016 |
| KR | 20110068442 A | 6/2011 |
| WO | 2014010713 A1 | 1/2014 |

OTHER PUBLICATIONS

Written Opinion in PCT/CN2017/099534 dated Nov. 20, 2017, 6 pages.
First Office Action in Chinese Application No. 201710058610.0 dated Jan. 31, 2019, 14 pages.
The Partial Supplementary European Search Report in European Application No. 17845411.2 dated Jun. 18, 2019, 12 pages.
The Extended European Search Report in European Application No. 17845411.2 dated Nov. 2, 2020, 14 pages.

* cited by examiner

Vapor Detection and Removing Device 100

Sensor
110

Vapor Removing Device
120

Processing Device
130

FIG. 1

DEVICES AND METHODS FOR DETECTING AND REMOVING VAPOR

CROSS-REFERENCE TO RELATED APPLICATIONS

This application is a continuation of U.S. patent application Ser. No. 16/285,155, filed on Feb. 25, 2019, which is a continuation of International Application No. PCT/CN2017/099534, filed on Aug. 29, 2017, which claims priority to Chinese Patent Applications No. 201610800005.1 filed on Aug. 31, 2016 and No. 201710058610.0 filed on Jan. 23, 2017, the content of which is hereby incorporated by reference to its entirety.

TECHNICAL FIELD

The present application generally relates to vapor detection and removing, and more particularly, to devices and methods for detecting and removing vapor for an imaging acquisition device.

BACKGROUND

When using a device, vapor (e.g., fog, water drop, frost, ice) may appear inside or outside the device. The appearance of the vapor may affect the performance of the device. For example, the appearance of the vapor inside or on the surface of an imaging acquisition device may affect the imaging performance of the imaging acquisition device. Thus, it may be desirable to develop devices and methods for detecting and/or removing vapor for a device automatically and efficiently.

SUMMARY

In one aspect of the present disclosure, a device may include a first light guide. The first light guide may include a first end to receive a light beam, and a second end to output the light beam at a predetermined angle with respect to a reference plane, so that when the light beam enters a target light transmission media from the first light guide, the light beam substantially perfectly reflects between a first surface and a second surface of the target light transmission media. The first surface and second surface may substantially parallel to the reference plane.

In some embodiments, the device may include a second light guide. The second light guide may include a first end to receive the light beam. The first end of the second light guide may locate at a predetermined distance away from the second end of the first light guide to allow the light beam to reflect a predetermined number of times at at least one of the first surface or the second surface.

In some embodiments, the device may further include the target light transmission media directly connected to the second end of the first light guide and connected to the first end of the second light guide.

In some embodiments, the device may further include a light emitter configured to emit the light beam having a first light intensity to the first end of the first light guide, and a light receiver configured to receive the light beam having a second light intensity from a second end of the second light guide.

In some embodiments, the device may further include an optical coupler circuit to transform the light beam received by the light receiver to a first electrical current.

In some embodiments, the optical coupler circuit may be further configured to supply a second electrical current to the light emitter.

In some embodiments, the device may further include a determination module to determine a change of the second light intensity with respect to the first light intensity, and output a first electronic signal when the change meets a first condition associated with change of reflectivity on the first surface of the target light transmission media for the light beam.

In some embodiments, the change of reflectivity on the first surface of the target light transmission media may be caused by frost, vapor, or fog appeared on the first surface of the target light transmission media.

In some embodiments, the change of the second light intensity with respect to the first light intensity may change gradually when the change of reflectivity on at least one of the first surface or the second surface of the target light transmission media is caused by frost, vapor, or fog.

In some embodiments, the device may further include a heater in a first side of the target light transmission media close to the first surface, and a processing module to receive and execute the first electronic signal. The first electronic signal may direct the processing module to activate the heater to increase temperature of the first surface.

In some embodiments, the device may further include an image acquisition device in the first side of the target light transmission media. The heater may include a ring heater coaxially surrounding a lens of the image acquisition device.

In some embodiments, the device may further include a determination module to determine a change of the second light intensity with respect to the first light intensity, and output a second electronic signal when the change meets a second condition associated with change of reflectivity on the second surface of the target light transmission media for the light beam.

In some embodiments, the change of reflectivity on the second surface of the target light transmission media may be caused by water appeared on the second surface of the target light transmission media.

In some embodiments, the change of the second light intensity with respect to the first light intensity may change suddenly when the change of reflectivity on at least one of the first surface or the second surface of the target light transmission media is caused by water.

In some embodiments, the device may further include a cleaning device on a second side close to the second surface of the target light transmission media configured to clean a surface, and a processing module to receive and execute the second electronic signal. The second electronic signal may direct the processing module to operate the cleaning device to clean the second surface of the target light transmission media.

In another aspect of the present disclosure, a method for operating a device is provided. The device may include a first light guide and a second light guide. The first light guide may include a first end to receive a light beam, and a second end connected to a first surface of a target light transmission media to output the light beam at a predetermined angle with respect to the first surface, so that when the light beam enters the target light transmission media from the first light guide, the light beam perfectly reflects between the first surface and a second surface of the target light transmission media substantially parallel to the first surface. The second light guide may include a first end connected to at least one of the first surface or the second surface to receive the light beam, wherein the first end the second light guide locates at a predetermined distance away from the second end of the first light guide to allow the light beam to reflect a predetermined number of times at at least one of the first surface or the second surface, and a second end to output the light beam. The method may include obtaining first intensity of the light beam at the first end of the first light beam; obtaining second intensity of the light beam at the second end of the second light guide; determining a change of the second light intensity with respect to the first light intensity; and outputting a first electronic signal when the change meets a first condition associated with change of reflectivity on the first surface of the target light transmission media for the light beam.

In another aspect of the present disclosure, a device may include a housing, a ring heater in the housing, a first electrode electrically connected to a ring heater, a second electrode electrically connected to the ring heater, a sensor to measure humidity inside the housing of the imaging acquisition device, and a control device electronically connected with the sensor.

In some embodiments, the control device may be configured to determine whether the humidity measured by the sensor exceeds a humidity threshold. Upon a determination that the humidity measured by the sensor exceeds the humidity threshold, the control device may control a power supply to supply electrical current to the ring heater through the first electrode and the second electrode.

In some embodiments, the device may further include a fixing device to fix the ring heater in the housing.

In some embodiments, the fixing device may further include a bayonet structure, and the ring heater further includes a hook engaged with the bayonet of the fixing device.

In some embodiments, the device may further include a lens of an image acquisition device. The ring heater and the lens may be co-axial, and a diameter of the ring heater is 2 mm to 4 mm larger than a diameter of the lens.

In some embodiments, the sensor may be further configured to measure a temperature inside the housing.

In some embodiments, the control device may be further configured to determine whether the temperature measured by the sensor exceeds a temperature threshold. Upon a determination that the temperature measured by the sensor exceeds the temperature threshold, the control device may control the power supply to stop supplying electrical current to the ring heater via the first electrode and the second electrode.

In some embodiments, the ring heater may be made of electrical conductive silica.

In some embodiments, the device may further include a conductive connector electronically connected to the first electrode, the second electrode, and a power supply.

In some embodiments, the housing may be transparent.

In some embodiments, the housing may include a transparent target light transmission media. The target light transmission media may include a first surface inside the housing, and a second surface outside the housing and substantially parallel to the first surface. The sensor may include a first light guide and a second light guide. The first light guide may include a first end to receive a light beam, and a second end connected to the first surface to output the light beam at a predetermined angle with respect to the first surface, so that when the light beam enters the target light transmission media from the first light guide, the light beam perfectly reflects between the first surface and the second surface of the target light transmission media. The second light guide may include a first end connected to at least one of the first surface or the second surface to receive the light beam, wherein the first end the second light guide locates at a predetermined distance away from the second end of the first light guide to allow the light beam to reflect a predetermined number of times at at least one of the first surface or the second surface, and a second end to output the light beam.

In some embodiments, the sensor may further include a light emitter configured to emit the light beam having first light intensity to the first end of the first light guide, and a light receiver configured to receive the light beam having second light intensity from a second end of the second light guide.

In some embodiments, the control device may be configured to determine a change of the second light intensity with respect to the first light intensity, and determines the humidity inside the housing exceeds a humidity threshold upon determining that the change of the second light intensity meets a first condition associated with change of reflectivity on the first surface of the target light transmission media for the light beam.

In some embodiments, the change of reflectivity on the first surface of the target light transmission media may be caused by frost, vapor, or fog appeared on the first surface of the target light transmission media.

In some embodiments, the control device may be further configured to determine a change of the second light intensity with respect to the first light intensity, and determine the change meets a second condition associated with change of reflectivity on the second surface of the target light transmission media for the light beam.

In some embodiments, the change of reflectivity on the second surface of the target light transmission media may be caused by water appeared on the second surface of the target light transmission media.

In some embodiments, the device may further include a cleaning device on a second side close to the second surface of the target light transmission media, configured to clean a surface; and a processing module to receive and execute the second electronic signal. The second electronic signal directs the processing module to operate the cleaning device to clean the second surface of the target light transmission media.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 illustrates a schematic diagram of an exemplary vapor detection and removing device according to some embodiments of the present disclosure;

DETAILED DESCRIPTION

Figure 2:
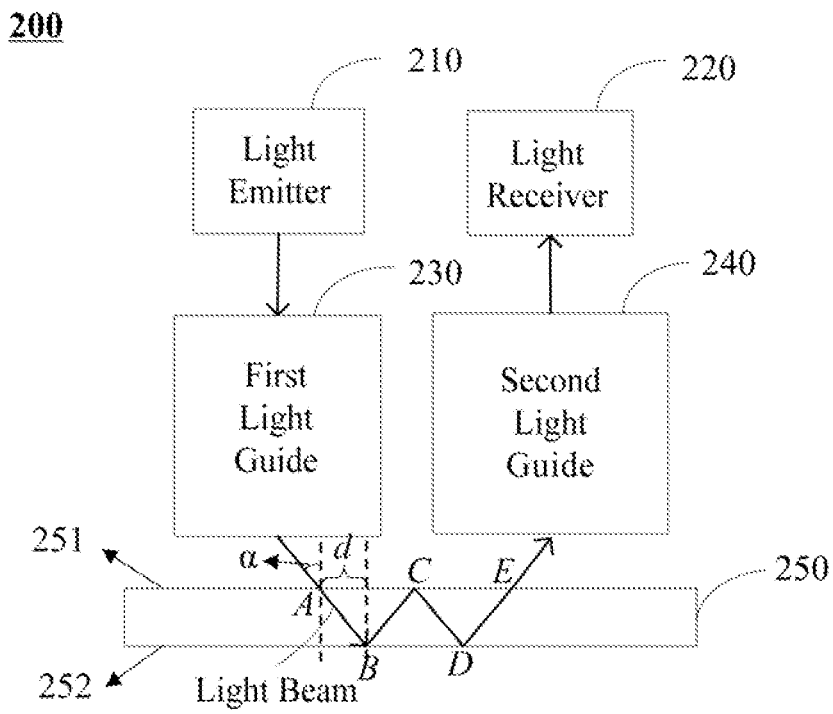
FIG. 2 illustrates a schematic diagram of an exemplary sensor according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expression if they may achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks), but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

An aspect of the present disclosure relates to devices and methods for vapor detection and removing inside or outside a device (e.g., an imaging acquisition device). The device may include a target light transmission media (e.g., a glass, plastic). When using the device, vapor (e.g., fog, water drop, frost, ice) may appear on the target light transmission media or inside the device. The vapor detection and removing device may include a senor, a vapor removing device, and a processing device. The senor may be configured to detect vapor on the target light transmission media or inside the device. The vapor removing device may include, such as a heater, a wiper, a rain shield, a dryer, a hot air blower, configured to facilitate vapor evaporation. The processing device may control the operation of the vapor removing device based on the detection result of the sensor. For example, the processing device may actuate the vapor removing device when the detection result indicates vapor appears on the target light transmission media or inside the device. As such, vapor inside or outside the device may be detected and removed automatically and efficiently.

FIG. 1 illustrates a schematic diagram of an exemplary vapor detection and removing device 100 according to some embodiments of the present disclosure. As shown, the vapor detection and removing device 100 may include a sensor 110, a vapor removing device 120, and a processing device 130. For brevity, the vapor detection and removing device 100 may refer to as the device 100.

The sensor 110 may be configured to detect vapor in a certain scenario. As used herein, the vapor may include water in any forms, such as one or more water drops (e.g., a raindrop), fog, frost, ice, snow, or the like, that attaches on a target surface. In some embodiments, the sensor 110 may be a humidity sensor configured to detect the humidity inside a device (e.g., an imaging acquisition device).

In some embodiments, the sensor 110 may be configured to detect vapor on one or more surfaces of a target light transmission media. The target light transmission media may be any material substance that light can be transmitted through. For example, the target light transmission media may be a housing (e.g., a glass) of an imaging acquisition device. The sensor 110 may include a light emitter, a light receiver, a first light guide, and a second light guide. Details regarding the sensor configured to detect vapor on the surfaces of the target light transmission media may be found elsewhere in the present disclosure (e.g., FIGS. 2 to 7D and the relevant descriptions).

The vapor removing device 120 may be configured to prevent and/or remove vapor. The vapor removing device 120 may include but is not limited to a heater, a cleaning device (e.g., a wiper, a rain shield, a dryer, a hot air blower), or the like, or any combination thereof.

For example, the vapor removing device 120 may include a heater configured to increase temperature of the target surface or the device (e.g., the imaging acquisition device such as a surveilling camera) to facilitate vapor evaporation. In some embodiments, the heater may be mounted in an imaging acquisition device configured to facilitate vapor evaporation in the imaging acquisition device. The heater may be any device that can generate heat. In some embodiments, the heater may include a ring heater coaxially surrounding a lens of the image acquisition device. Details regarding the ring heater may be found elsewhere in the present disclosure (e.g., FIGS. 8 to 10 and the relevant descriptions).

As another example, the vapor removing device 120 may be a cleaning device mounted on a side of a housing (e.g., a glass) of an imaging acquisition device. The cleaning device may clean the housing of the imaging acquisition device. In some embodiments, the cleaning device may be mounted on the side of the housing far from the lens of the imaging acquisition device. For example, the cleaning device may be mounted outside the housing.

The processing device 130 may control the operation of the vapor removing device 120 based on the detection result of the sensor 110. For example, the processing device 130 may determine whether the detection result satisfies a condition to activate the vapor removing device 120. Upon a determination that the vapor detection result satisfies the condition, the processing device 130 may activate the vapor removing device 120 to remove vapor. Upon a determination that the vapor detection result does not satisfy the condition, the processing device 130 may inactivate the vapor removing device 120.

In some embodiments, the device 100 may be applied in an image acquisition device. The imaging acquisition device may be and/or include any suitable device that is capable of acquiring image data (e.g., an image). Exemplary image acquisition device may include a camera (e.g., a digital camera, an analog camera, an IP camera (IPC), etc.), a video recorder, a scanner, a mobile phone, a tablet computing device, a wearable computing device, an infrared imaging device (e.g., a thermal imaging device), or the like. In some embodiments, the image acquisition device may include a gun camera, a dome camera, an integrated camera, a binocular camera, a monocular camera, etc.

In some embodiments, the image acquisition device may include a housing (e.g., a glass) mounted in front of a lens of the imaging acquisition device. The sensor 110 may be configured to detect vapor in or deposited on the housing of the imaging acquisition device. Additionally or alternatively, the sensor 110 may detect humidity inside the housing of the imaging acquisition device.

The processing device 130 may determine whether the detection result of the sensor 110 satisfies a condition to activate the vapor removing device 120. Upon a determination that the vapor detection result satisfies the condition, the processing device 130 may activate the vapor removing device 120 to remove vapor on or inside the imaging acquisition device. For example, the processing device 130 may activate a heater to increase the temperature inside the imaging acquisition device. As another example, the processing device 130 may activate a cleaning device to clean the housing of the imaging acquisition device.

It should be noted that the above descriptions of the device 100 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure.

In some embodiments, one or more components described above may be omitted or added. For example, the processing device 130 and/or the vapor removing device 120 may be omitted. As another example, the processing device 130 may further include a determination module and a processing module. The determination module may determine whether the vapor detection result satisfies a condition to activate the vapor removing device 120. The processing module may activate or inactivate the vapor removing device 120 based on the determination result generated by the determination module.

FIG. 2 illustrates a schematic diagram of an exemplary sensor 200 according to some embodiments of the present disclosure. The sensor 200 may detect vapor on one or more surfaces of a target light transmission media. The target light transmission media may be any material substance that light can be transmitted through. For illustration purposes, the present disclosure takes a glass 250 as an example. In some embodiments, the glass 250 may be a part of a housing of an image acquisition device. The glass 250 may include a first surface (i.e., a top surface 251) and a second surface (i.e., a bottom surface 252) that are substantially parallel to each other.

The sensor 200 may include a light emitter 210, a first light guide 230, a second light guide 240, and a light receiver 220.

The light emitter 210 may be configured to emit a light beam. In some embodiments, the light emitter 210 may emit a light beam with a constant light intensity. In some embodiments, the light emitter 210 may emit a light beam with an inconstant light intensity. The light beam emitted by the light emitter 210 may be visible light, infrared light, laser light, or the like, or any combination thereof.

The first light guide 230 may be configured to receive and transmit the light beam from the light emitter 210. For example, the first light guide may be a prism, a light guide such as optical fiber etc. The first light guide 230 may have a first end and a second end. The first end may be configured to receive the light beam emitted by the light emitter 210. The second end may be configured to output the light beam towards the glass 250. According to some embodiments, there may have a gap between the second end of the first light guide 230 and a first surface 251 (e.g., the upper surface) of the glass 250. Alternatively, the second end of the first light guide 230 may direct contact the first surface 251 of the glass 250, so that the light beam travels directly from the first light guide 230 into the glass 250. Further, the first light guide may output the light beam at a predetermined angle with respect to a reference plane parallel or substantially parallel to the first surface 251, so that after refraction at the upper surface 251, the light beam may have an incident angle sufficient for a perfect reflection or substantial perfect reflection (collectively "perfect reflection" hereinafter) on a second surface 252 (e.g., the lower surface) of the glass 250 (when the second surface is an interface with another light transmission media, such as air). Further, when the first surface and the second surface are parallel or substantially parallel with respect to each other the light beam may be trapped in the glass 250, keep being perfectly reflected between the first surface and the second surface of the glass 250, until the light beam hit a point on the first surface 251 or the second surface 252 where a difference of the refraction indexes between the inside and outside of the surface 252 does not support a perfect reflection, as shown in FIG. 2.

For example, as illustrated in FIG. 2, the light beam output by the first light guide 230 may perfectly reflect between the top surface 251 and the bottom surface 252 of the glass 250. The predetermined angle may also refer to the angle of incidence of the light beam, i.e., the angle form by the light beam and the normal of the glass 250 (as the angle α illustrated in FIG. 2). The normal may be an axis perpendicular to the top surface 251 and/or the bottom surface 252.

In some embodiments, the first light guide 230 may transform the light beam emitted by the light emitter 210 to parallel light beam and transmit the parallel light beam to the glass 250 at the predetermined angle respect to the reference plane so that the parallel light beam substantially perfectly reflects between the top surface 251 and the bottom surface 252 when the parallel light beam enters the glass 250.

The perfect reflection occurs when a propagated wave is transmitted form a transmission medium with high refractivity to a transmission medium with low refractivity from at an angle larger than a critical angle. The critical angle is the angle of incidence above which the perfect reflection occurs. The critical angle is associated with the refractivity of two transmission mediums.

The refractivity of the glass 250 is different from the refractivity of air. The predetermined angle may be determined based on the refractivity of the glass 250 and the air. When there is no interference on the top surface 251 and the bottom surface 252 of the glass 250, the light beam output by the first light guide 230 towards glass 250 at the predetermined angle may perfectly reflect at the interface between the glass 250 and the air without being refracted to the air.

Figure 3:
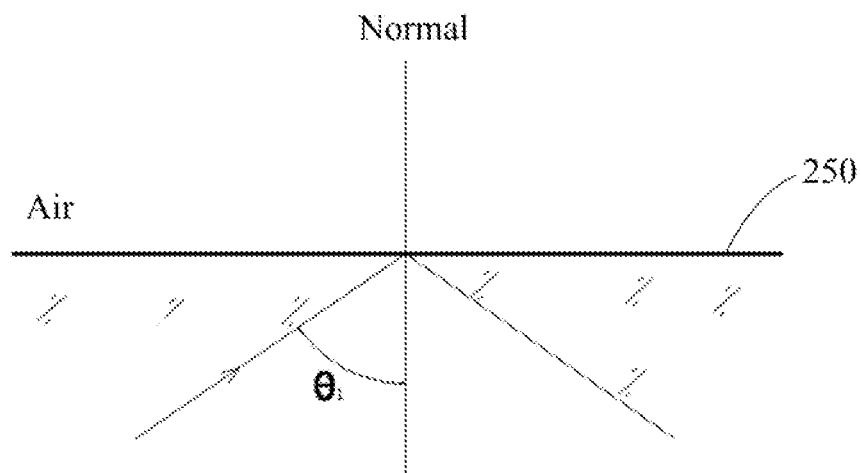
FIG. 3 illustrates a schematic diagram of perfect reflection according to some embodiments of the present disclosure.

For illustration purposes, it is assumed that the refractivity of the glass 250 is $n_1$ and the refractivity of the air is $n_2$. The critical angle (i.e., the angle of incidence above which the perfect reflection occurs) may be $\theta_1 = \sin^{-1} n_1/n_2$. The predetermined angle of the light beam output by the first light guide 230 towards the glass 250 may be equal to or greater than the critical angle. In some embodiments, the predetermined angle may be equal to the critical angle, that is, the $\theta_1$ as illustrated in FIG. 3. The light beam may perfectly reflect at the interface between the glass 250 and the air (e.g., at the top surface 251 or at the bottom surface 252 of the glass).

In some embodiments, the first end and the second end of first light guide 230 may form an angle so that the light beam may be output by the second end at the predetermined angle. In some embodiments, the second end of the first light guide 230 may be mechanically connected to a surface of the glass 250 (e.g., the top surface 251 or the bottom surface 252) so that the light beam may be directly transmitted to the glass 250 without being refracted by the air.

The first light guide 230 may have any suitable shape, such as a strip, a cylinder, or the like. In some embodiments, the first light guide 230 may be a light transmission stripe. The first light guide 230 may have made of any material that is able to transmit light. For example, the first light guide 230 may be optical fiber, a prism, or the light, or a combination thereof.

The second light guide 240 is of a predetermined distance away from the first light guide 230, so that the third end of the second light guide 240 locates on top of a point. The second light guide 240 may be made of the same material from the first light guide 230. Alternatively, the second light guide 240 may be made of different materials from the first light guide 230. The second light guide 240 may have a third end and a fourth end. The third end may be configured to receive the light beam from the glass 250. The light beam may undergo a predetermined number of times of reflections at the top surface 251 and/or the bottom surface 252 of the glass 250. The third end of the second light guide 240 may be mechanically connected to a surface of the glass 250 (e.g., the top surface 251 or the bottom surface 252), and thereby the light beam may be transmitted from the glass 250 directly to the second light guide 240. The fourth end may be configured to output the light beam towards the light receiver 220.

The predetermined distance may be associated with the predetermined number of times of reflections that the light beam undergoes inside the glass 250 (denoted as n), and a distance that the light beam travels after undergoing a single reflection (denoted as d). For example, as shown in FIG. 2, the light beam may enter the glass 250 at point A of the upper surface 251, traveling towards the lower surface 252; and then the light beam may be first reflected back by the lower surface 252 at point B towards the upper surface 251; and then the light beam may hit the upper surface 251 again be reflected back at point C towards the lower surface 252. The light beam may keep being reflected back at point D of the lower surface 252, until it hits point E of the upper surface 251, where the third end of the second light guide 240 connects to the upper surface 251. The change of refractive indexes at point E between the glass 250 and the media thereout. Accordingly, no reflection may occur at point E. As a result, the light beam may be output from the glass 250 and enter the second light guide 240. Therefore, the light beam is reflected three times from point A to point E. The path where the light beam travels may include several sections A-B, B-C, C-D, and D-E, wherein each section represents a light path that the light beam travels between the upper surface 251 and the lower surface 252. The distance d may refer to a distance component of each distance section A-B, B-C, C-D, and D-E along the top surface 251 and/or the bottom surface 252 of the glass 250. For example, the distance that the light beam travels after undergoing the first reflection may be denoted as d as illustrated in FIG. 2.

In order to receive the light beam from the glass 250, the third end of the second light guide 240 may cover where the light beam hits the upper surface 251 or the lower surface 202, i.e., the third end of the second light guide 240 may be in a position of an integer times of the distance d from the second end of the second end of the first light guide 230.

As shown from FIG. 2, when both the second end of the first light guide 230 and the third end of the second light guide 240 locate on the same side of the glass 250 (e.g., upper surface 251 of the glass 250), the number of reflection must be an odd number. Accordingly, the predetermined distance equals (2n+1)*d, where n is an integer greater than 0. Further, in order for the light beam to be reflected both on the upper surface 251 and the second surface 252, the number of reflection must be at least 3.

When the second end of the first light guide 230 and the third end of the second light guide 240 locate on two different side of the glass 250 (e.g., the second end locates on the upper side 251 and the third end locates on the lower side 252), the number of reflection must be an even number. Therefore, the predetermined distance equals to 2n*d. Further, in order for the light beam to be reflected both on the upper surface 251 and the second surface 252, the number of reflection must be at least 4.

In some embodiments, the second end of the first light guide 230 and the third end of the second light guide 240 may be directly connected to the surface of the glass 250.

The configuration of the second light guide 240 and the first light guide 230 may be the same or different. For example, the first light guide 230 and the second light guide 240 may have the same shape or not. In some embodiments, the second light guide 240 may be a light transmission stripe.

The light receiver 220 is configured to receive the light beam output by the fourth end of the second light guide 240.

In a particular embodiment, the sensor 200 may include a light emitter 210, a first light guide 230, a second light guide 240, and a light receiver 220. The light emitter 210 may be configured to emit a light beam with a constant light intensity. The first light guide 230 may be configured to transform the light beam to parallel light beam and transmit the parallel light beam towards a glass 250 of a camera at a predetermined angle with respect to a reference plane so that the light beam substantially perfectly reflects between a top surface 251 and a bottom surface 252 of the glass 250, wherein the top surface 251 and the bottom surface 252 may be parallel or substantially parallel to the reference plane. The second light guide 240 may be configured to receive the parallel light beam from the glass 250 after undergoing one or more reflections. The light receiver may be configured to receive the reflected parallel light beam from the second light guide 240. Therefore, the accuracy of the sensor 200 can be improved.

It should be noted that the example illustrated in FIG. 2 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the number of times that the light beam perfectly reflects inside the glass 250 may be 1, 2, 5, 10, or any suitable value. As another example, the first light guide 230 and the second light guide 240 may be arranged on different surfaces of the glass 250. As yet another example, the sensor 200 may be applied in vapor detection for a target light transmission media other than the glass 250. In some embodiments, the sensor 200 may be applied to detect vapor on a plastic transparent housing of an imaging acquisition device.

Figure 4:
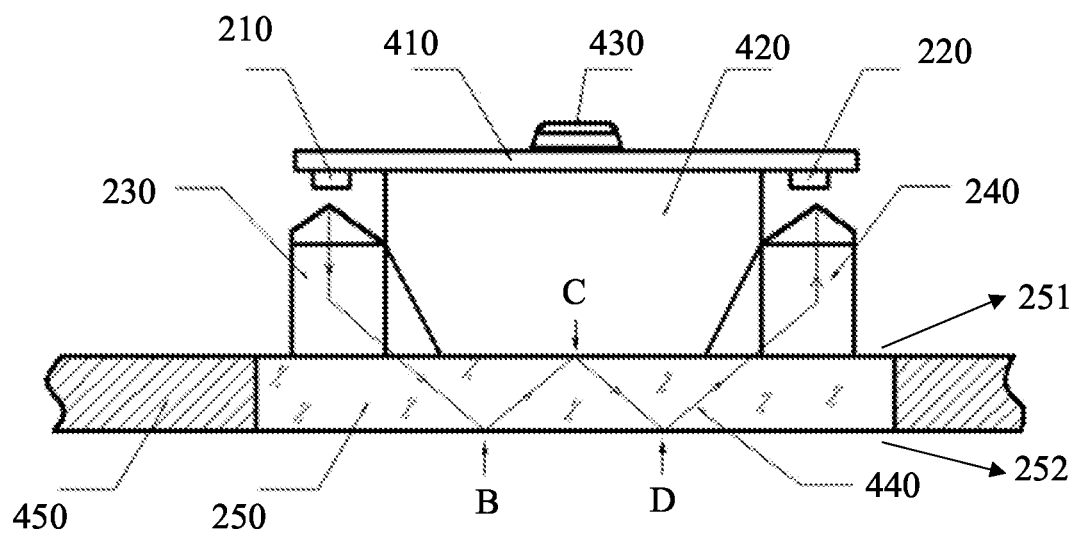
FIG. 4 illustrates a schematic diagram of an exemplary sensor mounted on a glass according to some embodiments of the present disclosure.
Figure 5:
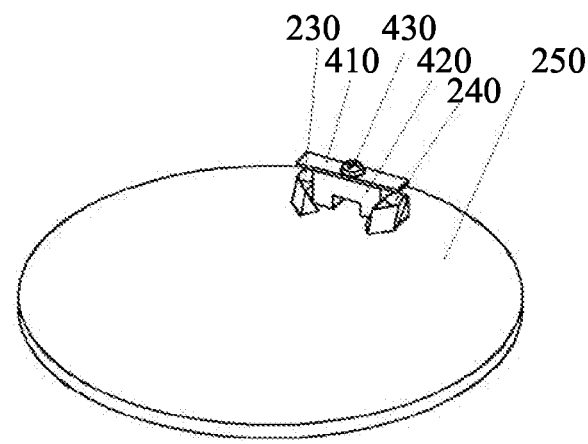
FIG. 5 illustrates a full view of an exemplary sensor mounted on a glass according to some embodiments of the present disclosure.

FIGS. 4 and 5 illustrates an exemplary sensor 400 mounted on a glass 250 according to some embodiments of the present disclosure. FIG. 4 illustrates a schematic diagram of the sensor 400 mounted on the glass 250. FIG. 5 illustrates a full view of the exemplary sensor 400 mounted on the glass 250. The sensor 400 may be similar to the sensor 200 as described in connection with FIG. 2, except for certain components or features. The glass 250 may be a glass of an imaging acquisition device mounted in front of the lens or a transparent housing covering the image acquisition device. The sensor 400 may be configured to detect vapor on the glass 250.

As illustrated in FIGS. 4 and 5, the sensor 400 may include a light emitter 210, a light receiver 220, a first light guide 230, a second light guide 240, an optical coupler circuit 410, a support 420, a screw 430, and a protective device 450. The line 440 in FIG. 4 may indicate a transmission path of the light beam. In some embodiments, the light beam may be parallel light beam.

The optical coupler circuit 410 may be electronically connected to the light emitter 210, and supply a first voltage (or a first current) to the light emitter 210. In some embodiments, the light emitter 210 may be mounted on the optical coupler circuit 410. Additionally, the optical coupler circuit 410 may be electronically connected to the light receiver 220, and receive a second voltage (or a second current) from the light receiver 220.

The light emitter 210 may be configured to convert the received first voltage (or the first current) into light beam and emit the light beam. In some embodiments, the light beam emitted by the light emitter 210 may have a constant light intensity or an inconstant light intensity.

The first light guide 230 may be mounted on the support 420. The first light guide 230 may be configured to receive the light beam from the light emitter 210 and output it towards the glass 250 at a predetermined angle with respect to a reference plane so that the light beam substantially perfectly reflects between a top surface 251 and a bottom surface 252 of the glass 250 when the light beam enters the glass 250 from the first light guide 230.

In some embodiments, the first light guide 230 may transform the light beam to parallel light beam and output the parallel light beam towards the glass 250 at the predetermined angle.

The second light guide 240 may be mounted on the support 420. The second light guide 240 may be configured to receive the light beam from the glass 250. The second light guide 240 may be configured at a predetermined distance away from the first light guide 230 so that the light beam reflects a predetermined number of times at at least one of the top surface 251 and the bottom surface 252 and then enters the second light guide 240.

The light receiver 220 may be electronically connected to the optical coupler circuit 410. The light receiver 220 may be configured to receive the light beam from the second light guide 240, and convert the received light beam into the second voltage (or the second current).

The screw 430 may be mechanically connected to the optical coupler circuit 410 to fix the optical coupler circuit 410. The support 420 may be mounted on the glass 250. The protective device 450 configured to protect the sensor 400. The protective device 450 may be mechanically connected to the glass 250.

The light beam output by the first light guide 230 towards the glass 250 at the predetermined angle may be reflected between the top surface 251 and the bottom surface 252 of the glass 250. When there is no interference on the two surfaces of the glass 250, the light beam may perfectly reflect between the top surface 251 and the bottom surface 252 of the glass 250. The light intensity of the light beam may remain constant or substantially constant when the light beam undergoes perfect reflections between the top surface 251 and the bottom surface 252. The light intensity of the light beam received by the light receiver 220 may be the same or substantially the same as the light intensity of the light beam emitted by the light emitter 210. For illustration purpose, the light intensity of the light beam emitted by the light emitter 210 may refer to as a first light intensity, and the light intensity of the light beam received by the light receiver 220 may refer to as a second light intensity.

In some embodiments, the light beam output by the first light guide 230 towards the glass 250 may be parallel light beam. The parallel light beam undergoes three times of perfect reflections between the top surface 251 and the bottom surface 252 of the glass 250 as illustrated in FIG. 4. One of the perfect reflections occurs on the top surface 251 adjacent to the light emitter 210, and another two occur on the bottom surface 252 far away from the light emitter 210. The light intensity of the parallel light beam may remain constant or substantially constant after the three times of perfect reflections. The light beam received by the second light guide 240 may have the same or substantially same light intensity with the light beam emitted by the light emitter 210.

It should be noted that the example illustrated in FIG. 4 is merely provided for the purposes of illustration, and not intended to limit the scope of the present disclosure. For example, the light beam may undergo any number of times of reflections between the top surface 251 and the bottom surface 252 of the glass 250. The distance between the first light guide 230 and the second light guide 240 may depend on the number of times of reflections that the light beam undergoes. As another example, the first light guide 230 and the second light guide 240 may be mounted on different surfaces of the glass 250.

When the air around the surfaces 251, 252 of the glass 250 is dry, the light beam may have perfect reflection between the upper surface 251 and lower surface 252. Accordingly, the light beam that is received by the light receiver 220 may have the same or substantially the same intensity as that of the light beam enters the first light guide 230. When vapor appears on the top surface 251 or the bottom surface 252 of the glass 250, however, because the refractive index of vapor is larger than the refractive index of dry air, the reflection property of the top surface 251 may change. The incident angle of the light beam on the top surface 251 and/or the bottom surface 252 of the glass 250 may be a predetermined angle, so that the reflectivity of the light beam on the above surface is sensitive to the change. For example, the top surface 251 may change from a perfect reflection surface for the light beam to a partially refraction and partially reflection surface. Accordingly, the light beam may lose certain percent of energy (e.g., the intensity of the light beam decreases), and/or the transmission path of the light beam in the glass 250 may change due to the different refractivity of the vapor and the air. The light beam received by the second light guide 240 may have a lower light intensity than the light beam emitted by the light emitter 210.

Figure 6:
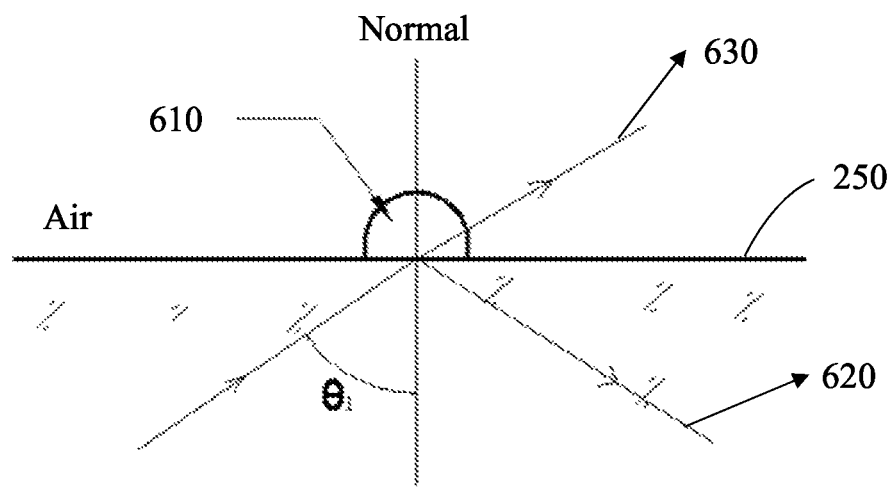
FIG. 6 illustrates a schematic diagram of reflection of light beam when a water drop appears on a glass according to some embodiments of the present disclosure.

For example, as illustrated in FIG. 6, when a raindrop 610 appears on a surface of the glass 250, a portion of the light beam may be reflected by the glass 250 (e.g., the light beam 620), while another portion may be refracted into the air (e.g., the light beam 630). Accordingly, the light intensity of the light beam received by the second light guide 240 (i.e., the second light intensity) may decrease. As another example, when fog, vapor, and/or frost appear on a surface of the glass 250, a portion the light beam may be refracted, thereby the second light guide 240 may only receive another portion that is reflected by the glass 250.

The optical coupler circuit 410 may be configured to convert the light beam received by the light receiver 220 into the second voltage (or the second current). The value of the second voltage (or the second current) may depend on the second light intensity of the light beam received by the light receiver 220.

When a raindrop appears on a surface the glass 250, the value of the second voltage (or the second current) generated by the optical coupler circuit 410 may suddenly change, because the appearance of the raindrop causes a sudden change of the reflectivity on the surface of the glass 250. Accordingly, the second light intensity of the light beam received by the light receiver 220 may decrease suddenly. The intensity decrease may depend from the reflectivity change (thereby the predetermined angle of the light beam) on the surface. It may also depend from how heavy the rain is. For example, as illustrated in 7A, the value of the second voltage remains constant at a high level in the time period 710, when the portion of the surface that the light beam reflects remains dry and clean. The second voltage, which reflects the intensity of the light beam received by the light receiver 220, decreases suddenly due to the appearance of the raindrop. The value of the second voltage remains at a low level in the time period 720 after the raindrop appears until the raindrop flows away, evaporates, or is wiped off.

Figure 7A:
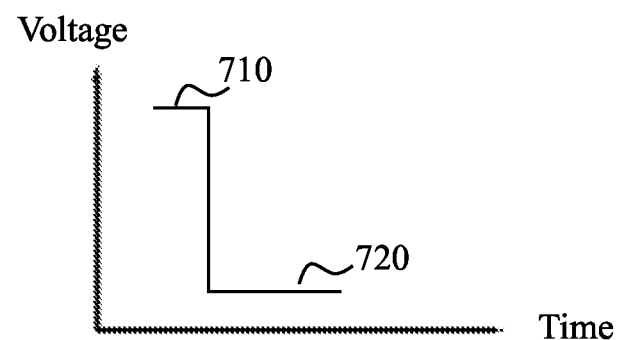
FIG. 7A to 7D illustrate schematic diagrams of a voltage generated by an optical coupler circuit in different scenarios according to some embodiments of the present disclosure.
Figure 7B:
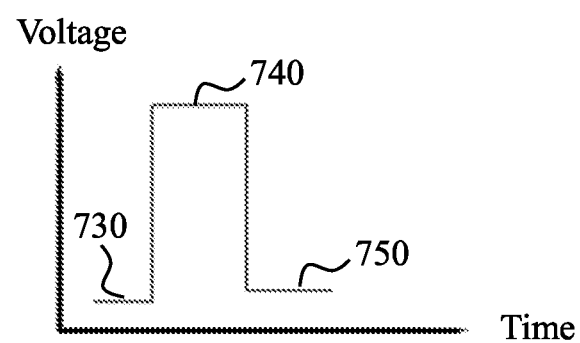

In some embodiments, the value of the second voltage may constantly change when it is raining. For example, as illustrated in FIG. 7B, the value of the second voltage remains at a first low level in the time period 730 due to a first raindrop. The first raindrop disappears so that the value of the second voltage changes back to a high level in the time period 740 when the raindrop leaves the surface (e.g., because of flowing away, evaporation, or being wiped off). When a second raindrop appears on a surface the glass 250, the value of the second voltage falls down suddenly. The value of the second voltage remains at a second low level in the time period 750 after the second raindrop appears until second the raindrop flows away, evaporates, or is wiped off.

Figure 7C:
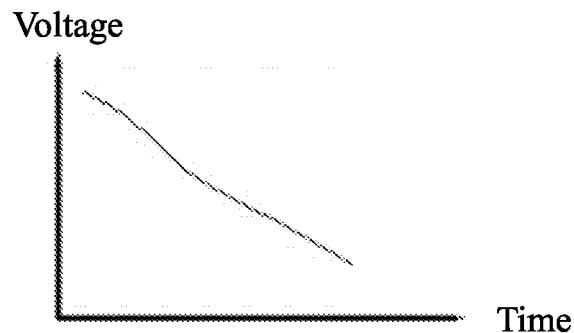
Figure 7D:
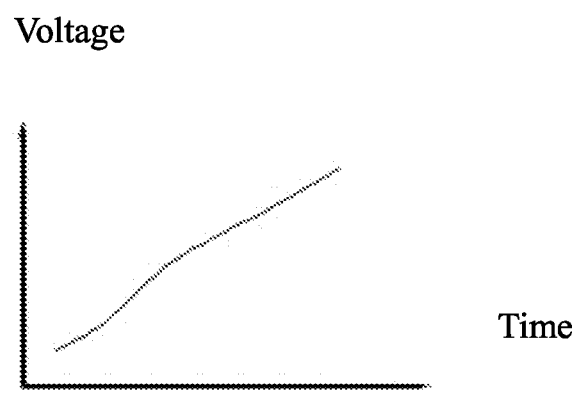

When fog, vapor, and/or frost appears on a surface the glass 250, the value of the second voltage (or the second current) generated by the optical coupler circuit 410 gradually change as illustrated in FIG. 7C. The appearance of the fog, vapor, and/or frost may cause a gradual change of the reflectivity on the surface of the glass 250. Accordingly, the second light intensity of the light beam received by the light receiver 220 may decrease gradually. When the fog, vapor, and/or frost gradually disappear, the light intensity of the light beam received by the light receiver 220 may increase gradually. The value of the second voltage generated by the optical coupler circuit 410 may increase gradually as illustrated in FIG. 7D.

It should be noted that the above description of FIG. 4 to FIG. 7D is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the sensor 400 may be applied in vapor detection for a target light transmission media other than the glass 205, such as a transparent plastic.

In some embodiments, the sensor 200 and/or the sensor 400 described above may further include a determination module configured to determine and/or measure a change of the second light intensity of the light beam received by the light receiver 220 with respect to the first light intensity of the light beam emitted by the light emitter 210. Additionally or alternatively, the determination module may output an electronic signal when the change meets a condition associated with change of reflectivity on surfaces of the glass 250 for the light beam.

The first light intensity may correspond to the first voltage (or first current) supplied to the light emitter 210. The second light intensity may correspond to the second voltage (or second current) generated by the optical coupler circuit 410. The determination module may determine and/or measure the change of the second light intensity with respect to the first light intensity based on the change of the second voltage (or second current) with respect to the first voltage (or first current).

For example, when the second voltage is the same or substantially same as the first voltage, the determination module may determine that there is no change of the second light intensity with respect to the first light intensity, and thereby no vapor appears on a surface of the glass 250. When the difference between the first voltage and the second voltage exceeds a threshold, the determination module may determine that vapor appears on a surface of the glass 250.

In some embodiments, when the first voltage remains constant or substantially constant, the determination module may determine whether the change of the second light intensity with respect to the first light intensity satisfies the condition based on the change of the second voltage. In some embodiments, the determination module may determine that the change satisfies the condition when the change of the value of the second voltage shows a preset pattern. For example, when the value of the second voltage suddenly decreases, the determination module may determine that one or more water drops (e.g., raindrops) appear on a surface of the glass 250. As another example, when the value of the second voltage gradually decreases, the determination module may determine that fog, vapor, or frost appears on a surface of the glass 250.

In some embodiments, the sensor 200 and/or the sensor 400 may further include a processing module. The processing module may receive and execute the electronic signal output by the determination device. The electronic signal may direct the processing module to operate a vapor removing device 120. The vapor removing device 120 may include but is not limited to a heater, a cleaning device (e.g., a wiper, a rain shield, a dryer, a hot air blower), or the like, or any combination thereof.

In some embodiments, the vapor removing device 120 may include a heater. The heater may be in a side of the glass 250 close to the top surface 251. The reflectivity on the top surface 251 of the glass 250 may change due to, such as frost, vapor, or fog appeared on the top surface 251. When the determination module determines that the change of the second light intensity with respect to the first light intensity meets the condition, the determination module may output an electronic signal to the processing module to direct the processing module to activate the heater to increase temperature of the top surface 251. The processing module may receive and execute the electronic signal to activate the heater. In some embodiments, the glass 250 may be a part of an imaging acquisition device. The heater may include a ring heater coaxially surrounding a lens of the image acquisition device (as will be described in connection with FIGS. 8 to 10).

In some embodiments, the vapor removing device 120 may include a cleaning device on a side close to the bottom side 252 of the glass 250. The reflectivity on the bottom surface of the glass 250 may change due to, such as water appeared on the bottom surface 252. When the determination module determines that the change of the second light intensity with respect to the first light intensity meets the condition, the determination module may output an electronic signal to the processing module to direct the processing module to activate the cleaning device on the bottom surface 252. The processing module may receive and execute the electronic signal to activate the cleaning device to clean the bottom surface 252.

Additionally or alternatively, when the determination module determines that the change of the second light intensity with respect to the first light intensity does not satisfy the condition associated with change of reflectivity on the surfaces of the glass 250, the determination module may output an electronic signal to the processing module to direct the processing module to inactivate the vapor removing device 120. The processing module may receive and execute the electronic signal to inactivate the vapor removing device 120.

In some embodiments, the sensor 200 and/or the sensor 400 may be mounted on a glass of a camera.

Figure 8:
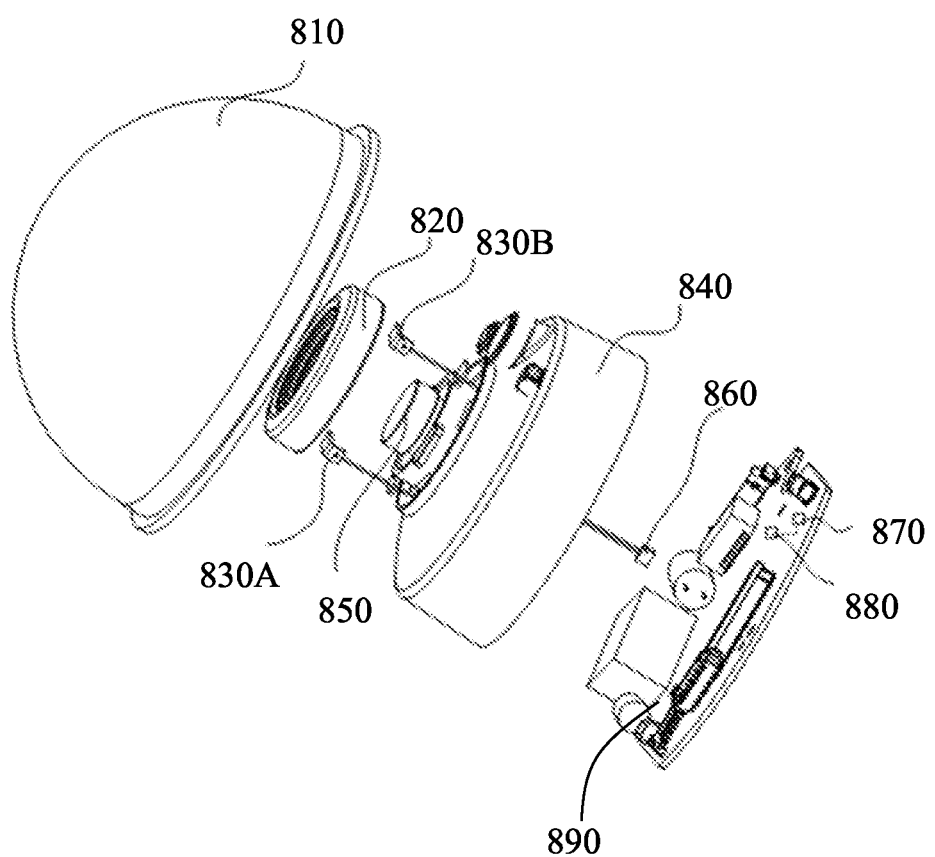
FIG. 8 illustrates an exemplary imaging acquisition device according to some embodiments of the present disclosure.

FIG. 8 illustrates an exemplary imaging acquisition device 800 according to some embodiments of the present disclosure. As shown in FIG. 8, the imaging acquisition device 800 may include a housing 810, a vapor removing device, a fixing device 840, a lens 850, a sensor 870, a control device 880, and one or more circuit elements 890 (e.g., a circuit interface, a voltage transformer). In some embodiments, the housing 810 may be a transparent housing.

The vapor removing device may be a heater configured to increase the temperature in the imaging acquisition device 800 to facilitate vapor evaporation. In some embodiments, the vapor removing device may include a ring heater 820, a first electrode 830A, and a second electrode 830B. The first electrode 830A and the second electrode 830B may electronically connected to the ring heater 820 respectively.

The fixing device 840 may be configured to fix one or more components in the housing 810, such as the vapor removing device (e.g., the ring heater 820), and the lens 850. The lens 850 and the vapor removing device may connected to the fixing device 840 respectively. The ring heater 820 may coaxially surround the lens 850.

The housing 810 may be configured to around the fixing device 840. The housing 810 may be made of, such as plastic, glass, or the like. It should be noted that the housing 810 illustrated in FIG. 8 is merely provided for the purposes of illustration, and not intended to limit the scope of the present disclosure. The housing 810 may have any regular shape or irregular shape. For example, the housing 810 may be a transparent plate.

The sensor 870 may be an embodiment of the sensor 120 as described in connection with FIG. 1. The sensor 870 may be configured to detect vapor and/or humidity inside and/or outside the housing. For example, the sensor 870 may include the sensor 400 shown in FIG. 4. Alternatively, the sensor 870 may be other type of vapor and/or humidity sensors commercially available by the time of filing of this application.

In some embodiments, the housing 810 may include a transparent target light transmission media. The target light transmission media may include a first surface inside the housing 810, and a second surface outside the housing 810 and substantially parallel to the first surface.

The sensor 870 may detect vapor on the first surface and/or the second surface of the target light transmission media. For example, the sensor 870 may be substantially similar to the sensor 200 or the sensor 400 as described elsewhere in this disclosure (e.g., FIGS. 2 to 4 and the relevant descriptions). The sensor 870 may include a light emitter 210, a light receiver 220, a first light guide 230, and a second light guide 240. Details regarding the light emitter 210, the light receiver 220, the first light guide 230, and the second light guide 240 may be found elsewhere in the present disclosure (e.g., FIGS. 2 to 7D and the relevant descriptions).

In some embodiments, the sensor 870 may be configured to measure the humidity inside the housing 810. Additionally or alternatively, the sensor 870 may be configured to measure the temperature inside the housing 810. In some embodiments, the sensor 870 may be a temperature and humidity sensor configured to measure the temperature and the humidity inside the housing 810. In some embodiments, the imaging acquisition device 800 may include a temperature sensor configured to measure the temperature and/or a humidity sensor configured to measure the humidity inside the housing 810.

The control device 880 may be electronically connected to the sensor 870. The control device 880 may determine whether the humidity measured by the sensor 870 exceeds a preset humidity threshold. Upon a determination that the humidity exceeds the preset humidity threshold, the control device 880 may control a power supply to supply electrical current to the ring heater 820 through the first electrode 830A and the second electrode 830B.

The ring heater 820 may be configured to generate heat when the control device 880 controls the power supply to supply electrical current to the ring heater 820 through the first electrode 830A and the second electrode 830B. The ring heater 820 may be made of any electrical conductive material. In some embodiments, the ring heater 820 may be made of deformable material, such as electrical conductive silica. In some embodiments, the ring heater 820 may be made of thermoplastic elastomer (TPE), thermoplastic polyurethane elastomer (TPU), or thermoplastic rubber (TPR), or the like.

The ring heater 820 may be configured in any suitable shape. In some embodiments, the ring heater 820 may have a shape complementary to the lens 850. For example, the ring heater 820 may be annular when the lens 850 is a spherical lens.

When the humidity in the image acquisition device 800 exceeds a preset humidity threshold, the vapor removing device may be configured to remove vapor. The control device 880 may establish the electrical connection between the first electrode 830A and the second electrode 830B. The first electrode 830A, the second electrode 830B, and the ring heater 820 may form a closed loop in which the ring heater 820 serves as a resistance. The temperature of the ring heater 820 may increase when it is electrified. The ring heater 820 may then generate heat, and thereby the temperature inside the image acquisition device 800 may increase. The vapor in the image acquisition device 800 may be removed, and the imaging quality of the image acquisition device 800 can be improved. In addition, the imaging acquisition device 800 described in the present disclosure have a simple configuration. The manufacturing cost of the imaging acquisition device 800 may be relatively low.

Figure 9:
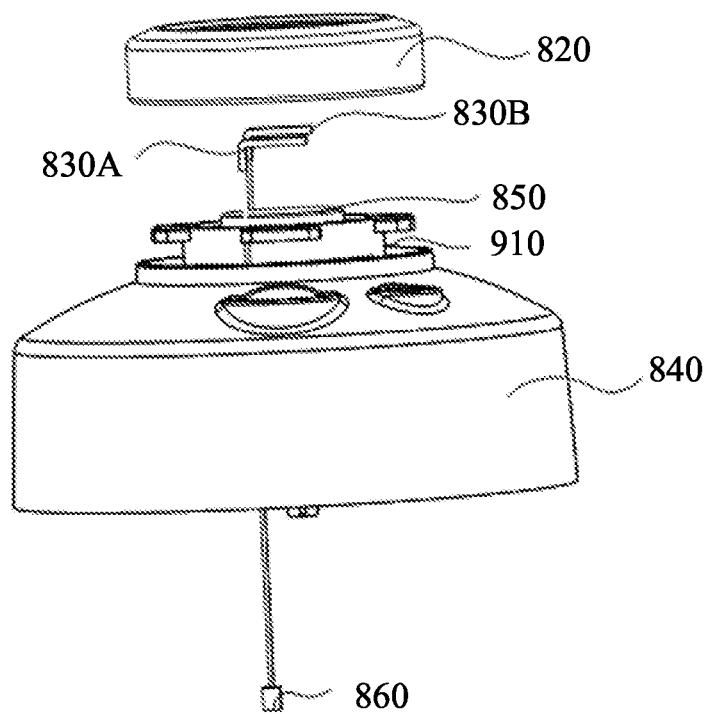
FIG. 9 illustrates an exemplary ring heater and a fixing device according to some embodiments of the present disclosure.
Figure 10:
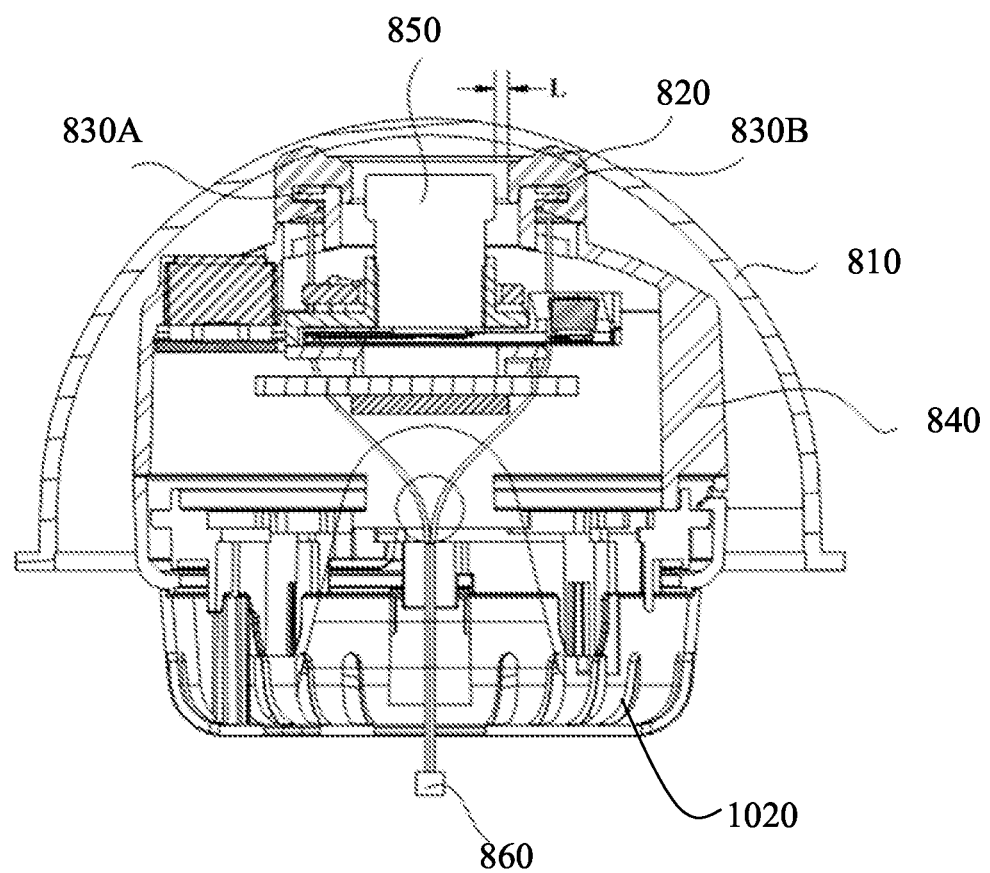
FIG. 10 illustrates a cross-sectional view of an exemplary ring heater and a fixing device according to some embodiments of the present disclosure.

FIGS. 9 and 10 illustrate an exemplary ring heater 820 and a fixing device 840 according to some embodiments of the present disclosure. FIG. 9 illustrates a perspective view of the ring heater 820 and the fixing device 840 when they are not assembled together. FIG. 10 illustrates a cross-sectional view of the ring heater 820 and the fixing device 840 when they are assembled together.

The ring heater 820 may include a hook (not shown in FIG. 9). The fixing device 840 may have a bayonet 910 complementary to the hook of the ring heater 820. The hook and the bayonet 910 may be engaged with each other so that the ring heater 820 and the fixing device 840 may be mechanically connected. In some embodiments, the ring heater 820 may be connected to the fixing device 840 via, for example, one or more screws, nails, pins, glue, positioning slots, or the like, or a combination thereof.

The first electrode 830A and the second electrode 830B may be connected to the fixing device 840 via, one or more screws, nails, pins, glue, positioning slots, or the like, or a combination thereof. For example, the first electrode 830A and the second electrode 830B may be connected to the fixing device 840 via a double-side adhesive tape.

In some embodiments, the first electrode 830A and the second electrode 830B may be mounted between the ring heater 820 and the fixing device 840. The ring heater 820 may be connected to the first electrode 830A and the second electrode 830B via a compression joint when the ring heater 820 and the fixing device 840 are connected to each other via the hook and the bayonet 910.

In some embodiments, the sensor 870 may be further configured to measure the temperature inside the housing 810 of the image acquisition device 800. The control device 880 may be further configured to determine whether the temperature measured by the sensor 870 exceeds a temperature threshold. Upon a determination that the temperature measured by the sensor 870 exceeds the temperature threshold, the control device 880 may control the power supply to stop supplying electrical current to the ring heater 820 via the first electrode 830A and the second electrode 830B.

It should be noted that the temperature threshold may be any suitable value. In some embodiments, the temperature threshold may be determined according to the temperature that the components of the imaging acquisition device 800 (e.g., a main chip, a circuit board) can withstand. When the temperature in the image acquisition device 800 measured by the sensor 870 reaches the temperature threshold, the control device 880 may cut off the electricity current supplied to the first electrode 830A and the second electrode 830B. In that way, the components of the imaging acquisition device 800 can be effectively protected.

In some embodiments, there may be a space between the ring heater 820 and the lens 850. The space between the ring heater 820 and the lens 850 may facilitate the heat dissipation of the electrical conductive ring 820, which may improve imaging quality and prevent image blurring.

In some embodiments, as illustrated in FIG. 10, the ring heater 820 and the lens 850 may be co-axial, and the diameter of the ring heater 820 is larger than the diameter of the lens 850. The distance between the diameters of the ring heater 820 and the lens 850 may be denoted as L as illustrated in FIG. 10. The L may be any suitable positive number. In some embodiments, the L may be in a range of 1 mm to 2 mm. The diameter of the ring heater 820 is 2 mm to 4 mm larger than the diameter of the lens 850. In some embodiments, the fixing device 840 may further include one or more heat dissipation holes 1020 as illustrated in FIG. 10 to facilitate the heat dissipation of the electrical conductive ring 820.

In some embodiments, the ring heater 820 may be interference fitted to the housing 810. Thereby, the ring heater 820 may be tightly connected to the housing 810 and block infrared light effectively. In addition, the compression joint between the first electrode 830A, the second electrode 830B, and the ring heater 820 may be tighter, and thereby the operation performance of the vapor removing device can be improved.

In some embodiments, the imaging acquisition device 800 may further include a conductive connector 860 configured on, such as the fixing device 840. The conductive connector 860 may be electronically connected to the first electrode 830A and the second electrode 830B. In some embodiments, the conductive connector 860 may be electronically connected to the first electrode 830A and the second electrode 830B via a wire. The conductive connector 860 may also be electronically connected to a power supply (e.g., a power supply interface). The control device 880 may control the electronical connection between the power supply and conductive connector 860, so as to control the electrical current supplied to the first electrode 830A, the second electrode 830B, and the ring heater 820.

In some embodiments, the first electrode 830A and the second electrode 830B may be welded to the wire. The power supply (e.g., power supply interface) may be a low-voltage power supply. The first electrode 830A and/or the second electrode 830B may be made of any conductively material, such as silver, copper, or the like.

It should be noted that the above description of FIGS. 8 to 10 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the vapor removing device may include a heater other than the ring heater 820, the first electrode 830A, and the second electrode 830B.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A device, comprising
a housing;
a ring heater in the housing;
a first electrode electrically connected to a ring heater;
a second electrode electrically connected to the ring heater;
a sensor to measure humidity inside the housing of an image acquisition device that is capable of acquiring image data, the image acquisition device including at least one of a camera, a video recorder, a scanner, a mobile phone, a tablet computing device, a wearable computing device, or an infrared imaging device; and
a processor electronically connected with the sensor and configured to:
determine whether the humidity measured by the sensor exceeds a humidity threshold; and
upon a determination that the humidity measured by the sensor exceeds the humidity threshold, establish an electrical connection between the first electrode and the second electrode and control a power supply to supply electrical current to the ring heater through the first electrode and the second electrode so that the ring heater generates heat to remove vapor in the image acquisition device.

2. The device of claim 1, further comprising a fixing device to fix the ring heater in the housing.

3. The device of claim 2, wherein:
the fixing device includes a bayonet structure; and
the ring heater includes a hook engaged with the bayonet structure of the fixing device.

4. The device of claim 3, wherein:
the ring heater and the fixing device are connected to each other via the hook and the bayonet structure, and
the ring heater is connected to the first electrode and the second electrode via a compression joint.

5. The device of claim 1, wherein:
the device further includes a lens of the image acquisition device;
the ring heater and the lens are co-axial, and
a diameter of the ring heater is 2 mm to 4 mm larger than a diameter of the lens.

6. The device of claim 1, wherein the sensor is further configured to measure a temperature inside the housing.

7. The device of claim 6, wherein the processor is further configured to:
determine whether the temperature measured by the sensor exceeds a temperature threshold; and
upon a determination that the temperature measured by the sensor exceeds the temperature threshold, cut off the electrical current supplied to the first electrode and the second electrode and control the power supply to stop supplying the electrical current to the ring heater via the first electrode and the second electrode.

8. The device of claim 1, wherein the ring heater is made of electrical conductive silica.

9. The device of claim 1, further comprising a conductive connector electronically connected to the first electrode, the second electrode, and a power supply.

10. The device of claim 1, wherein the housing is transparent.

11. The device of claim 1, wherein the ring heater is interference fitted to the housing.

12. The device of claim 1, wherein a shape of the ring heater is complementary to a shape of the lens.

13. The device of claim 1, wherein:
the housing includes a transparent target light transmission media, the target light transmission media including a first surface inside the housing, and a second surface outside the housing and substantially parallel to the first surface, and
the sensor includes:
a first light guide, including
a first end to receive a light beam; and
a second end connected to the first surface to output the light beam at a predetermined angle with respect to the first surface, so that when the light beam enters the target light transmission media from the first light guide, the light beam perfectly reflects between the first surface and the second surface of the target light transmission media; and
a second light guide, including
a first end connected to at least one of the first surface or the second surface to receive the light beam after the light beam is perfectly reflected between the first surface and the second surface, and
a second end to output the light beam.

14. The device of claim 13, wherein the sensor further includes:
- a light emitter configured to emit the light beam having a first light intensity to the first end of the first light guide;
- a light receiver configured to receive the light beam having a second light intensity from the second end of the second light guide.

15. The device of claim 14, wherein the processor is further configured to:
- determine a change of the second light intensity with respect to the first light intensity, and
- determine that the humidity inside the housing exceeds a humidity threshold upon determining that the change of the second light intensity is a gradual change caused by frost, vapor, or fog appeared on the first surface of the target light transmission media.

16. The device of claim 14, wherein the processor is further configured to:
- determine a change of the second light intensity with respect to the first light intensity, and
- determine that the change of the second light intensity is a sudden change caused by water appeared on the second surface of the target light transmission media.

17. The device of claim 16, further comprising:
- a cleaning device on a second side close to the second surface of the target light transmission media, configured to clean a surface; and
- a processing module to operate the cleaning device to clean the second surface of the target light transmission media in response to determining that the change of the second light intensity is a sudden change.

18. A method for operating a device, wherein the device comprises:
- a housing;
- a ring heater in the housing;
- a first electrode electrically connected to a ring heater;
- a second electrode electrically connected to the ring heater;
- a sensor to measure humidity inside the housing of an image acquisition device that is capable of acquiring image data, the image acquisition device including at least one of a camera, a video recorder, a scanner, a mobile phone, a tablet computing device, a wearable computing device, or an infrared imaging device; and
- a processor electronically connected with the sensor, and the method comprises:
  - determining, by the processor, whether the humidity measured by the sensor exceeds a humidity threshold; and
  - by the processor, upon a determination that the humidity measured by the sensor exceeds the humidity threshold, establishing an electrical connection between the first electrode and the second electrode and controlling a power supply to supply electrical current to the ring heater through the first electrode and the second electrode so that the ring heater generates heat to remove vapor in the image acquisition device.

19. The method of claim 18, wherein the sensor is further configured to measure a temperature inside the housing, and the method further comprises:
- determining, by the processor, whether the temperature measured by the sensor exceeds a temperature threshold; and
- by the processor, upon a determination that the temperature measured by the sensor exceeds the temperature threshold, cutting off the electrical current supplied to the first electrode and the second electrode and controlling the power supply to stop supplying the electrical current to the ring heater via the first electrode and the second electrode.

* * * * *